(12) United States Patent
Simon et al.

(10) Patent No.: US 10,794,768 B2
(45) Date of Patent: Oct. 6, 2020

(54) THERMOPILE INFRARED INDIVIDUAL SENSOR FOR MEASURING TEMPERATURE OR DETECTING GAS

(71) Applicant: Heimann Sensor GmbH, Dresden (DE)

(72) Inventors: Marion Simon, Bad Schwalbach (DE); Mischa Schulze, Hünstetten (DE); Wilhelm Leneke, Taunusstein (DE); Karlheinz Storck, Lorch am Rhein (DE); Frank Herrmann, Dohna (DE); Christian Schmidt, Dresden (DE); Jörg Schieferdecker, Dresden (DE)

(73) Assignee: Heimann Sensor GmbH, Dresden (DE)

( * ) Notice: Subject to any disclaimer, the term of this patent is extended or adjusted under 35 U.S.C. 154(b) by 0 days.

(21) Appl. No.: 16/309,513

(22) PCT Filed: Jun. 13, 2017

(86) PCT No.: PCT/EP2017/064429
§ 371 (c)(1),
(2) Date: Dec. 13, 2018

(87) PCT Pub. No.: WO2017/220381
PCT Pub. Date: Dec. 28, 2017

(65) Prior Publication Data
US 2019/0265105 A1 Aug. 29, 2019

(30) Foreign Application Priority Data

Jun. 21, 2016 (DE) .................. 10 2016 111 349

(51) Int. Cl.
*G01J 5/00* (2006.01)
*G01J 5/02* (2006.01)
(Continued)

(52) U.S. Cl.
CPC .......... *G01J 5/0014* (2013.01); *G01J 5/0225* (2013.01); *G01J 5/045* (2013.01); *G01J 5/048* (2013.01);
(Continued)

(58) Field of Classification Search
CPC .... G01J 5/0014; G01J 5/06; G01J 5/12; G01J 5/048; G01J 5/14; G01J 5/045;
(Continued)

(56) References Cited

U.S. PATENT DOCUMENTS 4,472,239 A 9/1984 Johnson et al.
4,654,622 A 3/1987 Foss et al.
(Continued)

FOREIGN PATENT DOCUMENTS

DE 4091364 1/1992
DE 19843984 A1 3/2000
(Continued)

*Primary Examiner* — David P Porta
*Assistant Examiner* — Meenakshi S Sahu
(74) *Attorney, Agent, or Firm* — Smartpat PLC

(57) ABSTRACT

The invention relates to a thermopile infrared individual sensor in a housing that is filled with a gaseous medium having optics and one or more sensor chips with individual sensor cells with infrared sensor structures with reticulated membranes, the infrared-sensitive regions of which are spanned by, in each case, at least one beam over a cavity in a carrier body with good thermal conduction. The object of the invention consists of specifying a thermopile infrared sensor using monolithic Si-micromechanics technology for contactless temperature measurements, which, in the case of a sufficiently large receiver surface, outputs a high signal with a high response speed and which can operated in a gaseous medium with normal pressure or reduced pressure and which is producible in mass produced numbers without complicated technology for sealing the housing. This is achieved by virtue of, in each case, combining a plurality of individual adjacent sensor cells (18) with respectively one infrared-sensitive region with thermopile structures (14, 15) on the membrane (12) on a common carrier body (1) of an individual chip to a single thermopile sensor structure with (Continued)

a signal output in the housing, consisting of a cap (12) sealed with a base plate (3) with a common gaseous medium (10).

10 Claims, 4 Drawing Sheets

(51) Int. Cl.
*G01J 5/04* (2006.01)
*G01J 5/14* (2006.01)
*G01N 21/3504* (2014.01)
*G01J 5/12* (2006.01)
*G01J 5/06* (2006.01)

(52) U.S. Cl.
CPC . *G01J 5/06* (2013.01); *G01J 5/12* (2013.01); *G01J 5/14* (2013.01); *G01N 21/3504* (2013.01); *G01J 2005/065* (2013.01); *G01J 2005/123* (2013.01)

(58) Field of Classification Search
CPC ............... G01J 5/0225; G01J 2005/065; G01J 2005/123; G01J 5/004; G01N 21/3504
See application file for complete search history.

(56) References Cited

U.S. PATENT DOCUMENTS

| | | | |
|---|---|---|---|
| 5,721,430 A * | 2/1998 | Wong | G01N 21/3518 250/339.13 |
| 6,342,667 B1 | 1/2002 | Shen et al. | |
| 6,372,656 B1 | 4/2002 | Laermer et al. | |
| 6,520,600 B1 | 2/2003 | Tackett et al. | |
| 6,710,348 B1 | 3/2004 | Rothley et al. | |
| 2003/0118076 A1 | 6/2003 | Schieferdecker et al. | |
| 2007/0158570 A1* | 7/2007 | Ohta | G01J 5/02 250/338.1 |
| 2008/0251722 A1 | 10/2008 | Hayashi et al. | |
| 2011/0174978 A1 | 7/2011 | Forg et al. | |
| 2013/0093037 A1 | 4/2013 | Kirihara et al. | |
| 2015/0177070 A1 | 6/2015 | Maes et al. | |
| 2016/0025571 A1 | 1/2016 | Herrmann et al. | |

FOREIGN PATENT DOCUMENTS

| | | |
|---|---|---|
| DE | 10144343 A1 | 3/2003 |
| DE | 10321639 A1 | 12/2004 |
| DE | 19954091 | 9/2005 |
| DE | 102010042108 | 10/2013 |
| EP | 2587234 A1 | 5/2013 |
| JP | 2007121047 A | 5/2007 |
| JP | 2007187495 A | 7/2007 |
| JP | 2011145296 A | 7/2011 |
| JP | 2011179828 A | 9/2011 |
| JP | 2012008003 A | 1/2012 |
| JP | 2012230010 A | 11/2012 |
| JP | 2015507206 A | 3/2015 |
| WO | 9102229 A1 | 2/1991 |
| WO | 2006120862 A1 | 11/2006 |
| WO | 2013120652 A1 | 8/2013 |

* cited by examiner

THERMOPILE INFRARED INDIVIDUAL SENSOR FOR MEASURING TEMPERATURE OR DETECTING GAS

TECHNICAL FIELD

The invention relates to a thermopile individual sensor for measuring temperature or detecting gas in monolithic silicon micromechanical technology in a housing filled with a gas medium and having an optical unit and also one or more sensor chips having individual sensor cells having infrared sensor structures having reticulated membranes, the infrared-sensitive regions of which are each spanned by at least one beam over a cavity in a carrier body with good thermal conduction.

BACKGROUND

Thermopile infrared sensors which are produced in silicon micromechanical technology exist in greatly varying embodiments. For example, a thermopile sensor chip is described in DE 101 44 343 A1, which, with vertical or nearly vertical walls, has the largest possible membrane as an IR receiving area, in order to maximize the signal to be received using an IR-sensitive area on the membrane. The membrane is spanned over a recess in a silicon carrier body, which is also formed as a heat sink.

A further solution is proposed in DE 103 21 639 A1, in which thermopile elements are provided, the hot ends of which are positioned on the membrane and the cold ends of which are located on a silicon carrier body.

These embodiments share the feature that a homogeneous thin membrane carries many thermocouples, for example, thermopile elements, and the sensor chip is housed in a housing having atmospheric pressure and typically dry air or dry nitrogen. To obtain the greatest possible signal voltage in thermopile sensor elements, the thermocouples thereof have to be formed as long as possible, because thus less heat conduction and therefore a greater temperature difference is achieved between the hot and cold ends of the thermocouples.

Therefore, sufficiently high signal voltages for many applications cannot be achieved on smaller chip areas and the signal-to-noise ratio or the detection limit in measuring tasks does not meet the requirements. If such a chip is used for detecting gas, for example, the sensitive sensor area alone already has to be selected as quite large, for example, 1×1 mm, or larger. The sensor chips themselves are then also significantly larger, which is disadvantageous for the user.

It is disadvantageous that the signal voltage achieved per unit of area is not sufficient for many applications; the large area also has a high time constant (thermal inertia), and this thus causes an excessively slow reaction time. The required signal voltage therefore cannot be achieved with low reaction time by homogeneous, unstructured membranes having many thermocouples.

A single thermopile sensor is proposed in WO 91 02229 A1, in which a single free-floating membrane is arranged over a recess in the chip body, which membrane is connected via the longest possible beam to a heat sink, i.e., the edge of the chip body. Inclined walls, which delimit the recess, arise due to the etching method applied for the production of the recess in the chip body. In this sensor, larger signals may be achieved on a smaller area because of the better absorber region on the membrane. However, the thermal conductivity of the "normal atmosphere" (i.e., air, nitrogen) enclosing the absorber region prevents the sensor from achieving a sufficiently high signal. Furthermore, the inclined walls, which result in a very large and thus quite expensive overall chip with respect to the sensitive area, are disadvantageous.

Furthermore, a thermopile infrared sensor in monolithic silicon micromechanics is proposed in DE 10 2012 042 108 A1, which can achieve a significantly higher signal voltage on a very small area, by the sensor chip membrane being provided with slots and an inner area receiving the IR radiation being suspended on the absorber region on thin webs, via which a few thermocouples are led from the silicon edge ("cold" contacts) to the absorber region ("warm" contacts). To enhance the insulation of the inner absorber area, the sensor element is enclosed in a housing having a medium of lower thermal conductivity, of significantly less than air.

In this manner, quite high signal levels may be achieved for quite small membranes (absorber areas). If one increases the size of the absorbing area to the 0.5×0.5 mm ... 1×1 mm area typically necessary at least for so-called NDIR gas sensors, however, the absorber area, which then becomes more and more sluggish, however results in a long time constant, i.e., the response speed of the sensor chip sinks and the sensor would be excessively slow for many applications.

Thermal sensor structures having thin membrane and slots for etching out parts of the underlying carrier substrate are also proposed in U.S. Pat. No. 4,472,239 A and 4,654,622 A. In both cases, the underlying recesses only reach a small depth, which—as in the above-described solutions—only permits low sensitivities in the case of cost-effective housing solutions without high vacuum leak-tightness.

Thermopile sensor cells are described in DE 199 54 091 A1 and U.S. Pat. No. 6,342,667 B, in which the recess below the sensor structure is etched free through slot structures in the form of large triangles in the peripheral region of the membrane or in the form of a cross in the middle of the membrane. In both cases, this is performed by a wet etching method, which does not permit large distances to the heat sink on the periphery to arise due to inclined walls. The plurality of thermocouples arranged in parallel prevents large temperature differences between "hot" and "cold" contacts and thus prevents higher signal sensitivities from being achieved.

Cells of infrared radiation sensors are proposed in DE 198 43 984 A1. The recesses of the individual cells have vertical walls, which go through the entire substrate, wherein the substrate encloses the recess. A membrane is located above the recess. However, a plurality of rather short thermocouples is also provided, which do not permit a high sensitivity. The recesses are produced by micromechanical solutions, for example, by etching through an opening in the membrane, wherein the depth of the etching can be 50-200 µm. The short distance between the sensor structure on the membrane and the heatsink of at most 200 µm is disadvantageous here, which has the result, because of the thermal conductivity of the gas, that a high sensitivity is not achieved.

Furthermore, a thermopile sensor cell having thin membrane and slotted structure is proposed in DE 40 91 364 C1. The absorber region on the membrane is held via a long beam and a few thermocouples, wherein holes or slots are located in the membrane. The beam having the thermocouples and a width of 130 µm is insulated from the substrate periphery and the absorber region by slots, which are also wide, however. The carrier substrate located under the sensor structure is wet-etched from the rear side, which results in inclined walls in the substrate. The entire arrangement is provided with a filling having a protective gas.

In principle, higher temperature differences and sensitivities may be achieved using such a solution. However, the wide slots prevent an optimum area utilization (degree of filling) of the sensor cell. The wet-etched recess in the carrier substrate has inclined walls going outward, wherein the entire sensor cell is to be approximately 2×2 mm in size. The substrate walls inclined outward do not permit small sensor cells or cell intervals. The large structure of the suspended receiving area results in slower response speed and a high time constant, and therefore many measuring tasks which require rapid measurements are not possible.

In summary, it may be stated that the thermal infrared sensor cells proposed in the prior art either achieve excessively low signal levels per unit of area because of a large-area chip technology without sufficient thermal insulation of the absorber, or, in the case of sufficiently large sensitive area of the individual absorber region, have excessively high time constants and therefore react excessively sluggishly and slowly in a measuring task.

SUMMARY

The object of the invention is to specify a thermopile infrared sensor in monolithic silicon micromechanical technology for contactless temperature measurements or NDIR gas detection, which outputs a high signal having high response speed with sufficiently large receiver area and can be operated under a gas medium at normal pressure or at reduced pressure and can be produced without complex technologies for the housing closure in mass piece counts.

This is achieved in a thermopile infrared individual sensor of the type mentioned at the outset in that, in each case, multiple individual adjacent sensor cells respectively having one infrared-sensitive region are combined with thermopile structures on the membrane on a common carrier body of an individual chip to form an individual thermopile sensor structure having a signal output in the housing, consisting of a cap sealed with a base plate, having a common gas medium.

In a first embodiment of the invention, the signals of individual sensor cells of each sensor chip are combined to form one output signal by series circuit, parallel circuit, or in a combination of series and parallel circuit and led out via a terminal.

The cavity under each membrane having the infrared-sensitive regions preferably has vertical or nearly vertical walls, which are driven in from the wafer rear side.

Alternatively, the cavity under each membrane having the infrared-sensitive regions can have inclined walls, which are etched out from the front side through the slots in the membrane.

The common gas medium is preferably a gas having a significantly higher molar mass than air, such as xenon, krypton, or argon under normal atmospheric pressure.

The gas medium is preferably a gas or gas mixture having a pressure which is significantly lower than normal atmospheric pressure.

In a further embodiment of the invention, the signal of each of the individual sensor cells of a sensor chip is conducted via an individual preprocessing channel having an individual preamplifier, impedance converter, or analog-to-digital converter, wherein some or all of the individual preprocessing channels of the individual sensor cells have at least one integrating function or a low-pass function.

Furthermore, the preprocessed signals of the individual sensor cells of a sensor chip are advantageously combined in an electronic summing circuit, such as a multiplexer and/or microcontroller, to form an output signal.

In a refinement of the invention, the signal processing channels of the individual sensor cells and a summing unit are housed on the same semiconductor carrier body or on an adjacent semiconductor chip inside the sensor housing.

Alternatively, in addition to the signal preprocessing channels and the summing unit, further electronic signal processing units, such as temperature or voltage references or for computing temperatures or gas concentrations are housed on the same semiconductor carrier body, or on an adjacent semiconductor chip inside the sensor housing in the common gas medium.

Furthermore, the thermopile structures consist of n-conductive and p-conductive polysilicon applied in a CMOS process, amorphous silicon, germanium, or a mixed form of silicon and germanium, or of applied thermoelectric thin metal layers made of bismuth or antimony, to ensure cost-effective manufacturing.

The invention is particularly advantageously suitable for use of at least two thermopile infrared individual sensors, each forming one sensor channel, adjacent to one another under a common cap on a common bottom plate as a gas detector, wherein a separate optical filter of different wavelength is provided for each sensor channel and wherein a partition wall is arranged in each case between adjacent sensor channels.

To improve the long-term stability and drift resistance, one of the sensor channels is equipped with a reference filter.

The thermopile infrared individual sensors forming sensor channels are advantageously suitable for employment for NDIR gas detection.

BRIEF DESCRIPTION OF THE DRAWINGS

The invention will be described in greater detail hereafter on the basis of exemplary embodiments.

DETAILED DESCRIPTION

Figure 1A:
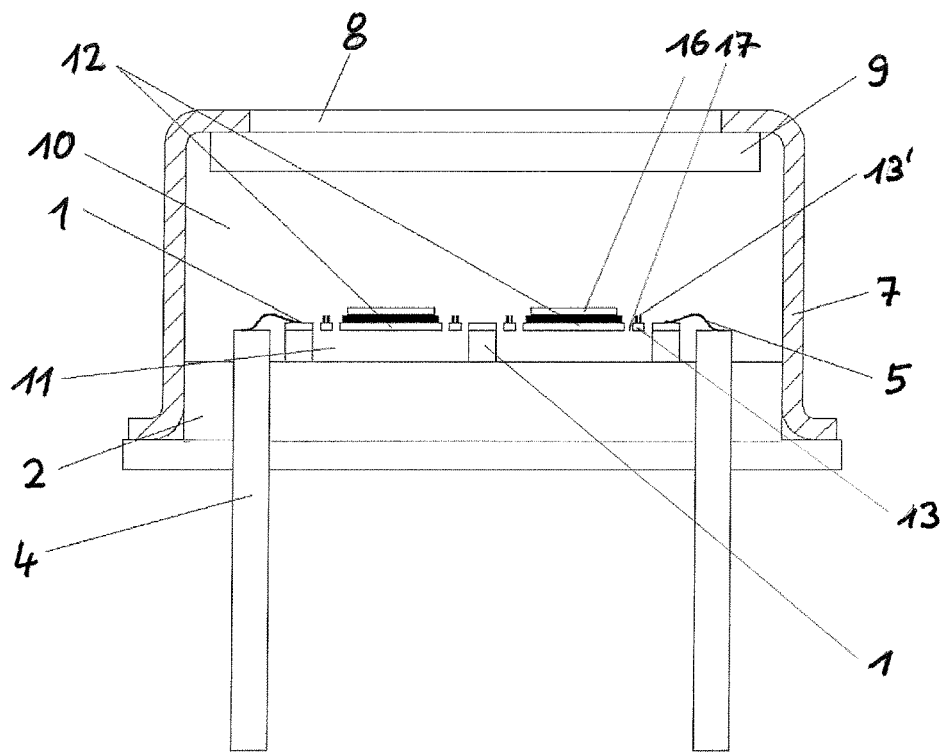
FIG. 1 shows the basic structure of a thermopile individual sensor according to the invention having multiply structured individual chip in a housing a) having vertical walls, b) having inclined walls.

The schematic structure of a thermopile infrared individual sensor according to the invention on an individual chip is shown in FIGS. 1a, b. The thermopile individual sensor is constructed on a common frame-shaped semiconductor carrier body 1, for example made of silicon, and is located in a sensor housing, consisting of a bottom plate 2, and also a base plate 3 having electrical terminals 4, which are each connected via a wire bridge 5 having terminal pads 6 to the frame-shaped semiconductor carrier body 1 (FIGS. 2 and 3), and also a cap 7 having an aperture opening 8 and an optical unit 9, wherein the sensor housing encloses a gas medium 10 in a leak-tight manner.

The carrier body 1 is provided with a cavity 11, which is spanned by a membrane 12 having a sensitive region (absorber region) and is connected via beams 13 to the frame-shaped semiconductor carrier body 1, which is used as a heat sink.

The gas medium 10 is a gas or gas mixture, which has a thermal conductivity which is lower than that of air or nitrogen, in order to keep convection from the central sensitive region on the membrane 12 to the carrier body 1 as low as possible. The gas medium 10 is preferably a gas having a high molar mass, such as xenon, krypton, or argon, or a gas having an internal pressure significantly reduced in relation to normal air pressure. The sensor housing has to be sealed in this case such that no gas exchange can occur with the surroundings.

Figure 2:
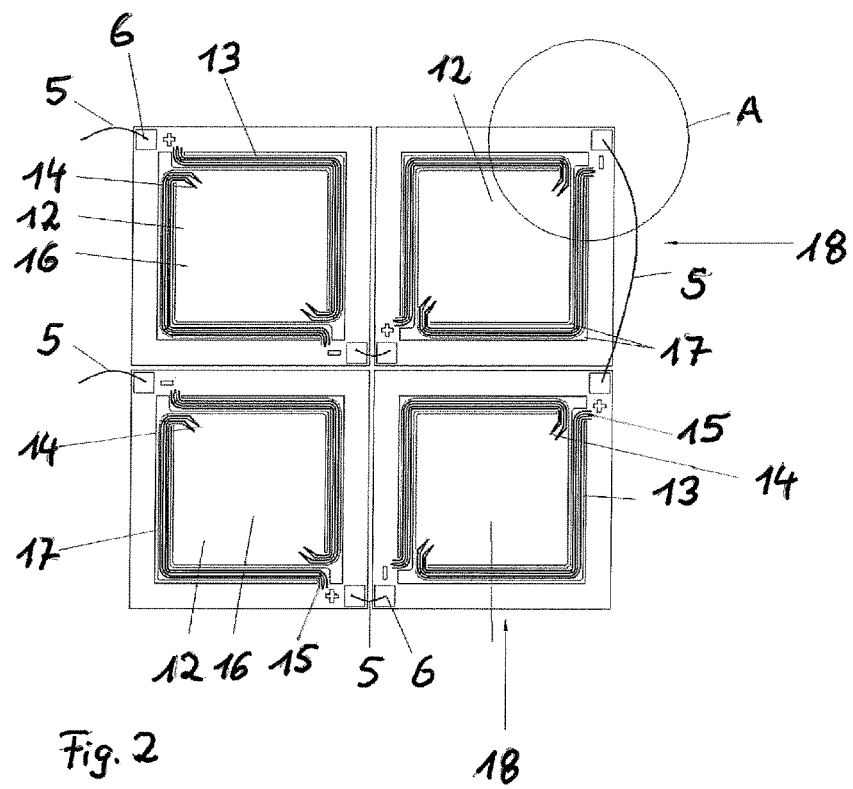
FIG. 2 shows a top view of an individual chip according to the invention of the thermopile sensor having an arrangement of the thermopile sensor chip having four-fold structured sensor cell.
Figure 3:
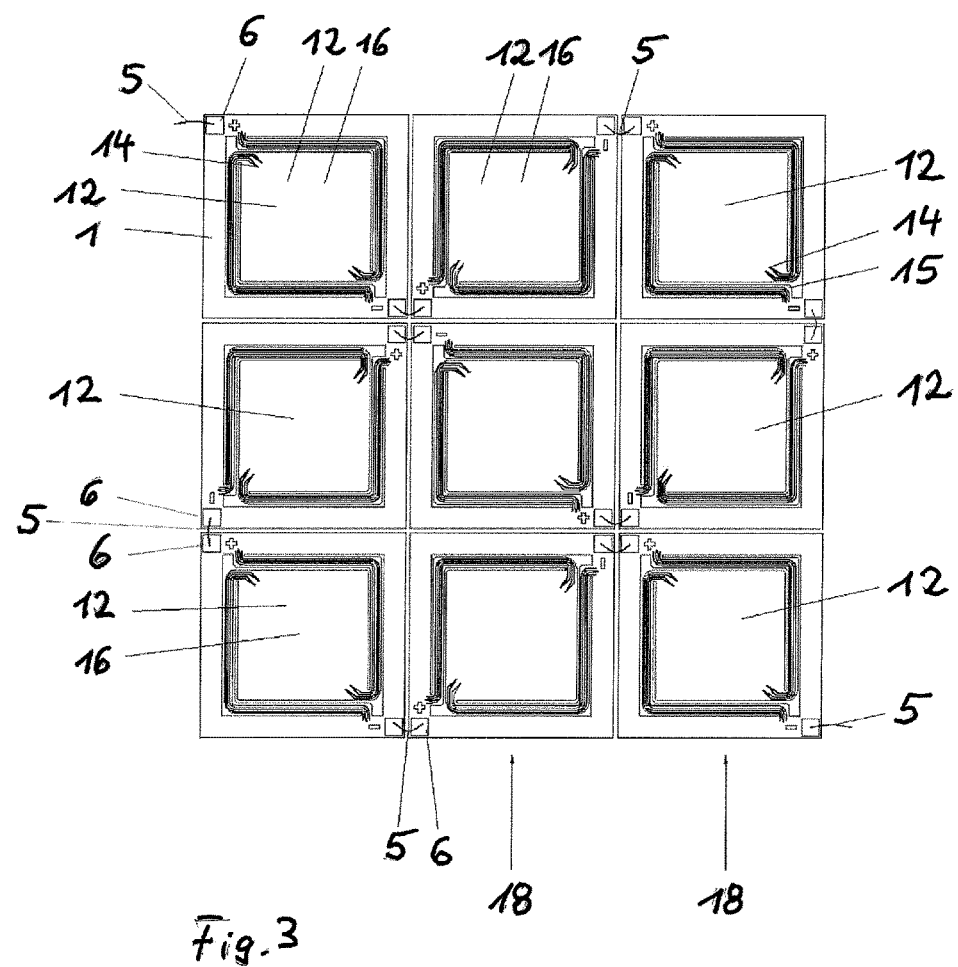
FIG. 3 shows a top view of an individual chip according to the invention having nine-fold structured sensor cell, each in series circuit.
Figure 6:
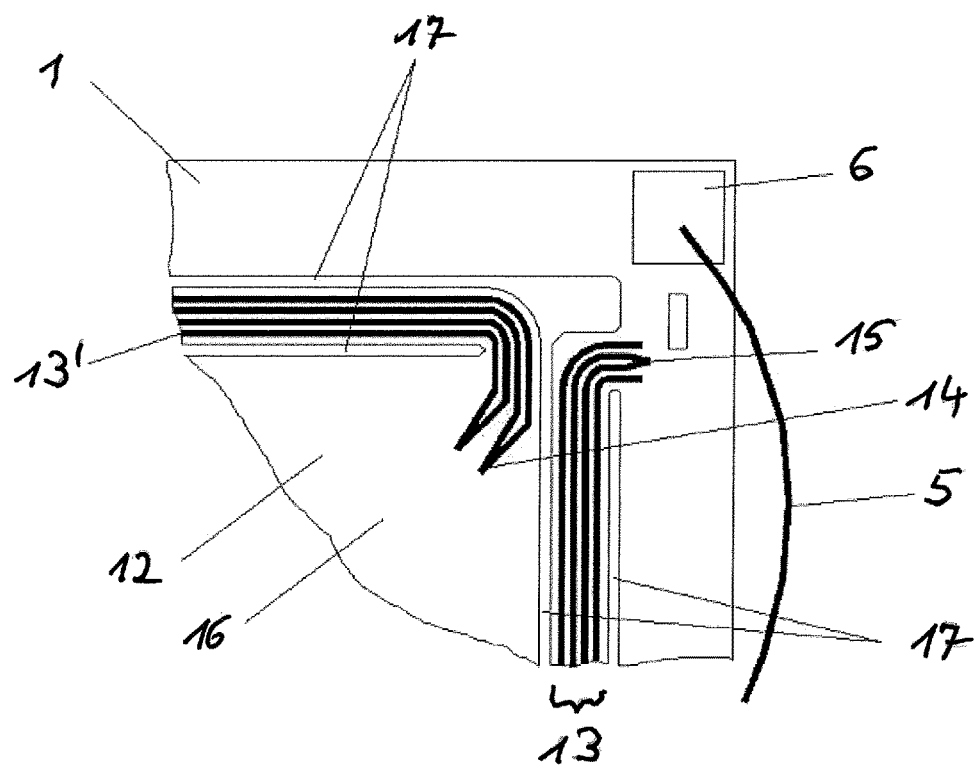
FIG. 6 shows an enlarged illustration of detail A from FIG. 2.

The sensor chip, consisting of the carrier body 1 of an individual chip, contains multiple individual cells 18 having a slotted membrane 12 and a beam structure 13, on which thermocouples 13', such as thermopile structures, are housed, the "hot" contact 14 of which is located on the membrane 12 and the "cold" contact 15 is located on the carrier body 1. Furthermore, a thin absorber layer 16 (preferably thinner than 1 μm) is located on the membrane 12, to cause the thermal mass of the sensitive region to be low and the response speed to be high. Slots 17 are located between the membrane 12 and the beams 13, and between these and the carrier body 1, for thermal separation (FIGS. 2, 3, 6).

The thermocouples of the thermopile structure are produced from thermoelectric materials known per se of different thermoelectric polarity. These can be both semiconductor materials applied in a CMOS process, for example, n-conductive and p-conductive polysilicon, (doped) amorphous silicon, germanium, or a mixed form of silicon and germanium, or applied thermoelectric thin metal layers (for example, bismuth, antimony, inter alia), wherein the thickness is less than 1 μm in each case.

Figure 1B:
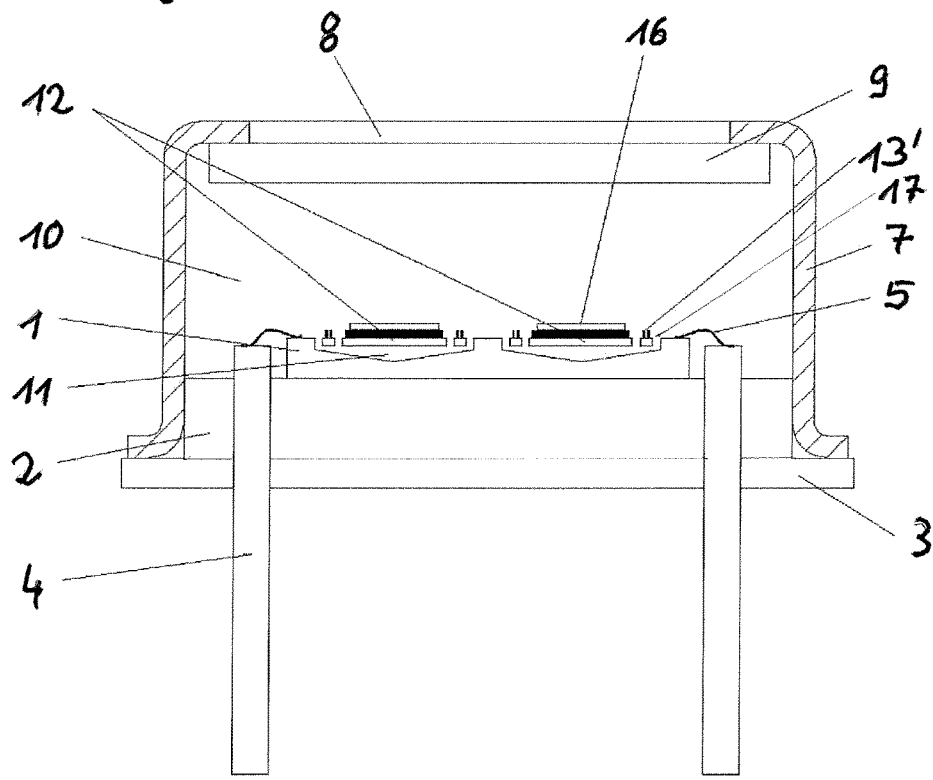

The membranes 12 having the beams 13 and the sensitive region are spanned on the carrier body 1 above the cavities 11. These cavities 11 can be introduced, for example, by dry etching (deep RIE) from the wafer rear side and preferably then have vertical walls (FIG. 1a), or can be driven in through the membrane 12 by etching of sacrificial layers or of the semiconductor substrate itself from the front side through slots 17 (FIGS. 2 and 3) in the semiconductor substrate to form the carrier body 1. The inclined walls of the cavity 11 in FIG. 1b are one example of the latter.

The advantageous effect according to the invention arises in that multiple smaller cells 18 (for example, 2, 4, 9, or 16 cells) having slotted membranes 12 are located closely adjacent on the area of a thermopile individual sensor, which cells form a receiving area just as large as known individual element thermopile chips by interconnection, wherein the gas medium 10 enables high individual signal levels per cell 18.

As a result of the relatively small dimensions of the individual cells 18 and the sensitive regions thereof on the respective membranes 12, significantly lower time constants and higher response speeds result than in a non-segmented thermopile chip of typical size. The summation of the signals of all cells 18 of a thermopile chip in turn results in a significantly higher signal voltage at equal size of the thermopile chip.

FIGS. 2 and 3 show the thermopile individual sensor according to the invention having multiple cells 18 as a top view, in order to illustrate the arrangement and interconnection of the individual cells 18 of the thermopile individual sensor. In this case, each cell 18 acts like an individual thermopile known per se, except the geometrical area of the individual cells 18 is typically significantly smaller than in the conventional thermopile individual sensor.

Each cell 18 of the thermopile individual sensor has a + and a − terminal (bond pads 5). All cells 18 formed as a thermopile are interconnected with one another to form an effective thermopile individual sensor. Preferably, all cells 18 of a thermopile individual sensor are connected in series in this case, by connecting together the respective + and − terminals like individual batteries in a battery block. However, a parallel circuit or a combination of series and parallel circuit is also possible.

FIG. 2 shows a four-fold cell structuring and FIG. 3 shows a nine-fold cell structuring.

Figure 4:
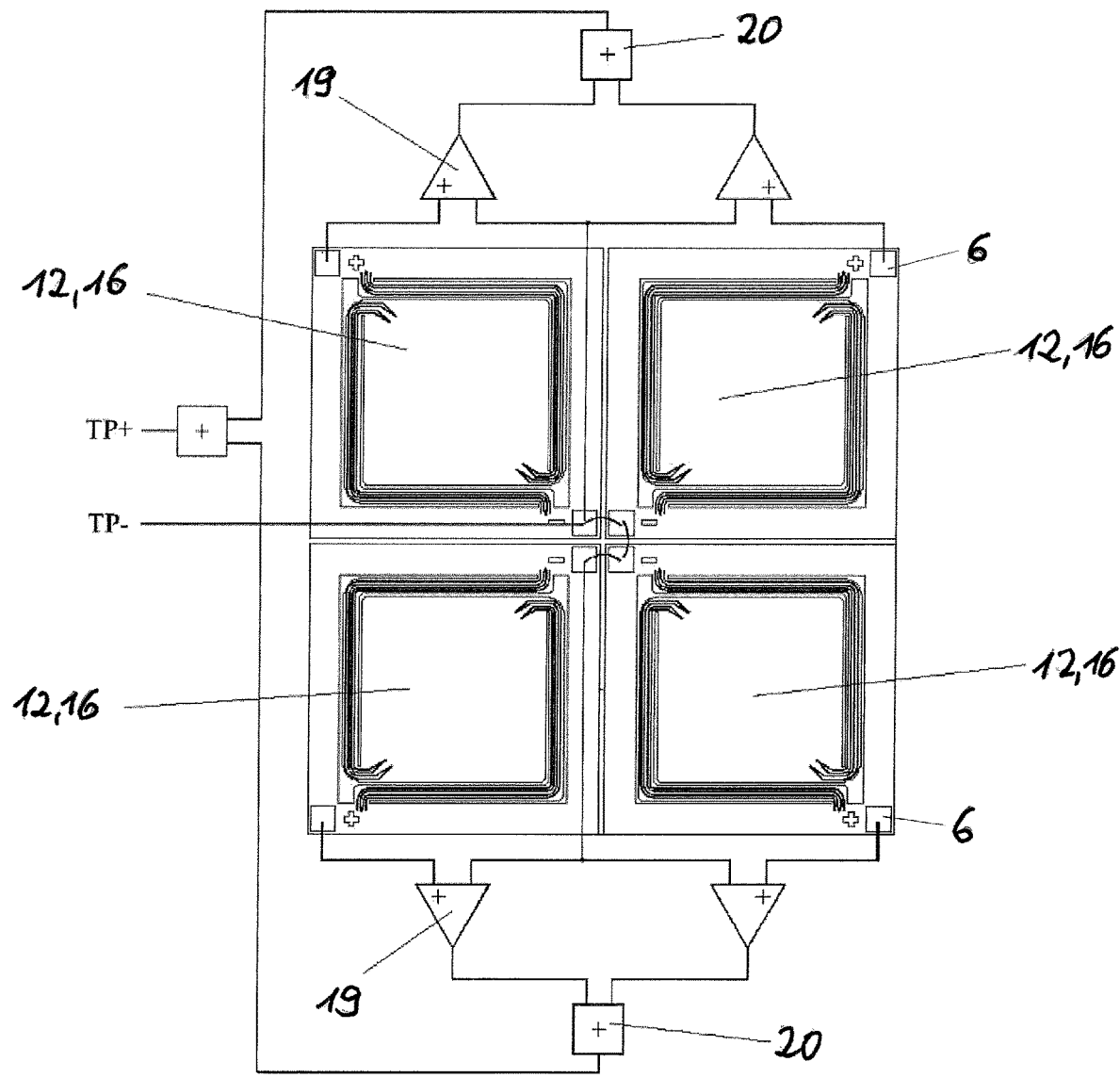
FIG. 4 shows an embodiment of the thermopile sensor according to the invention having summation of the signals of the individual structures via preamplifiers or impedance converters and electronic summing elements.

A further embodiment of the invention consists of the use of preamplifiers or impedance converters 19 and/or electronic summing elements 20 or multiplexers/microcontrollers, instead of the simple series circuit of the cells 18 (FIG. 4).

Such a signal electronics unit having preamplifiers or preamplifiers and low-pass filter 19 and a summing element 20 or a multiplexer can be housed both on the same substrate as the thermopile individual sensor, or on a separate chip but in the housing, or outside the housing. The summation can also take place in a microprocessor, which processes the pre-amplified, filtered, and multiplexed signals of the individual cells 18.

Since the function of the noise-limited low-pass filter or the downstream microprocessor is sufficiently comprehensible, a separate illustration was omitted in FIG. 4.

The summation element 20 preferably consists of a signal multiplexer for all cells 18 and the downstream A/D converter having microprocessor, which adds the signals of all cells 18 in a low-noise manner. The structure of at least a part of the signal processing is expediently housed in the housing, because then electrical or electromagnetic interfering influences from the outside can be suppressed better.

A further advantage of the integrated preamplifier 19 or impedance converter per cell 18 consists of the following:

If more or thinner thermocouples of a cell 18 are connected in series, the signal thus increases, but the impedance (thermocouple, resistor) also does. If many (for example, 4, 9, 16, or also more) cells 18 are connected in series and the signal is led to the outside without preamplifier or impedance converter, very high impedances (internal resistances) of the overall thermopile individual sensor thus result. With increasing impedance, the risk of noise interference of external interference sources or an additional noise source indicated by the current noise of the input circuit of the downstream electronics increases, which is negligible, inter alia, in the case of lower impedance. Both effects can reduce the measurement accuracy.

In particular for NDIR gas detection (NDIR: non-dispersive infrared technology), it is advantageous to integrate two or more sensor channels made of one thermopile individual sensor each into one housing, i.e., two or four thermopile infrared individual sensors according to the invention are arranged adjacent to one another in one housing.

Multiple gases can thus be measured simultaneously. One of the sensor channels is optionally equipped with a reference filter, which significantly improves the long-term stability and drift resistance. The other channel or channels then measure one or more specific gases.

Figure 5:
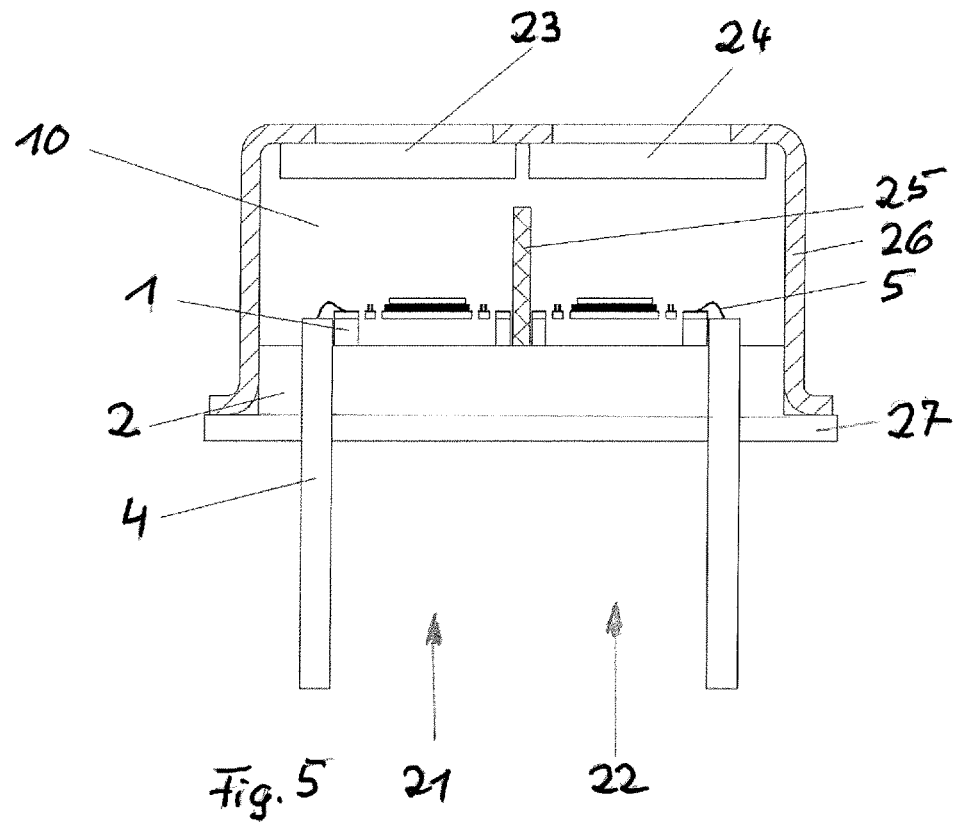
FIG. 5 shows a further thermopile sensor structure according to the invention having a multichannel sensor, for example, for detecting gas.

As an example of such a multichannel thermopile sensor, FIG. 5 shows a dual thermopile sensor, which is particularly suitable for NDIR gas detection.

According to the invention, multiple cells 18 are again combined to form one thermopile individual sensor (per channel) and two such thermopile individual sensors 21, 22 are arranged adjacent to one another under a common cap 26 on a common bottom plate 27, wherein a separate optical filter 23, 24 is provided for each channel. In addition, an optical partition wall 25 between adjacent channels is recommended, which prevents optical crosstalk of the infrared radiation between adjacent channels. For this purpose, the partition wall 25 has to absorb the infrared radiation and cannot transmit it or reflect it.

In this case, a common ground pin (negative terminal) on the bottom plate 27 can be associated with each cell 18 and the positive terminals are each led out via an individual terminal. Alternatively, multiple channels can be led via a preamplifier and low-pass filter to a multiplexer and read out in succession via one output line.

The combined thermopile individual cells can all also be located on the same chip, which simplifies the signal processing, or can be housed on separate individual chips, as shown in FIG. 5. Depending on the size, 2 to 4, but also 10 or more individual channels can also be located in one housing. The partition walls 18 can be mounted both on the bottom plate 27, or in the cap 26.

In addition to the signal processing channels and the electronic summing unit, further electronic signal processing units (for example, having temperature or voltage references or a calculation circuit for computing object temperatures or gas concentrations) can be housed on the same semiconductor carrier body 1 inside the sensor housing.

LIST OF REFERENCE NUMERALS 1 carrier body
2 bottom plate
3 base plate
4 terminal
5 wire bridge
6 terminal pad
7 cap
8 aperture opening
9 optical unit
10 gas medium
11 cavity
12 membrane
13 beam
13' thermocouples
14 hot contact
15 cold contact
16 absorber layer
17 slot
18 cell
19 preamplifier or preamplifier and low-pass filter
20 summation element
21 thermopile individual sensor
22 thermopile individual sensor
23 optical filter
24 optical filter
25 partition wall
26 cap
27 bottom plate

The invention claimed is:

1. A thermopile infrared sensor, comprising:
a housing filled with a gas medium, the housing having a base plate and a cap;
an optical unit arranged at an aperture opening in the housing;
a sensor chips having a plurality of sensor cells, each of the plurality of sensor cells having
an infrared-sensitive region with thermopile structures arranged on a membrane spanned by beams over a cavity,
the plurality of sensor cells being combined on a common carrier body to form
a thermopile sensor structure; and
a terminal extending through the base plate of the housing,
wherein signals of the plurality of sensor cells are combined by a series circuit, a parallel circuit, or a combination of a series and a parallel circuit to form an output signal, and
wherein the output signal is directly led out via the terminal.

2. The thermopile infrared sensor as claimed in claim 1, wherein the cavity under each membrane has vertical or nearly vertical walls, which are driven in from a wafer rear side.

3. The thermopile infrared sensor as claimed in claim 1, wherein the cavity under each membrane has inclined walls, which are etched out from a front side through slots in the membrane.

4. The thermopile infrared sensor as claimed in claim 1, wherein the gas medium is a gas having significantly higher molar mass than air under normal atmospheric pressure.

5. The thermopile infrared sensor as claimed in claim 4, wherein the gas medium is a gas or gas mixture having a pressure which is significantly lower than normal atmospheric pressure.

6. The thermopile infrared sensor as claimed in claim 1, wherein the thermopile structures consist of n-conductive and p-conductive polysilicon applied in a CMOS process, amorphous silicon, germanium, or a mixed form of silicon and germanium, or of thermoelectric thin metal layers made of bismuth or antimony.

7. The thermopile infrared sensor as claimed in claim 1, wherein the gas medium is xenon, krypton, or argon.

8. The thermopile infrared sensor as claimed in claim 1, wherein the output signal is directly led out via the terminal through a wire bridge which connects the terminal to a bond pad on the common carrier body.

9. The thermopile infrared sensor as claimed in claim 1, further comprising:
a second sensor structure formed by a second plurality of sensor cells;
a partition wall arranged between the sensor structure and the second sensor structure;
a first optical filter arranged on a first side of the partition wall and associated with the sensor structure; and
a second optical filter arranged on a second side of the partitional wall and associated with the second sensor structure,
wherein the output signal forms a first sensor channel and a second output of the second sensor structure forms a second sensor channel.

10. An NDIR gas detector comprising the thermopile infrared sensor as claimed in claim 9.

* * * * *